E. M. WRIGHT.
Churn Dasher.
No. 47,763.
Patented May 16, 1865.
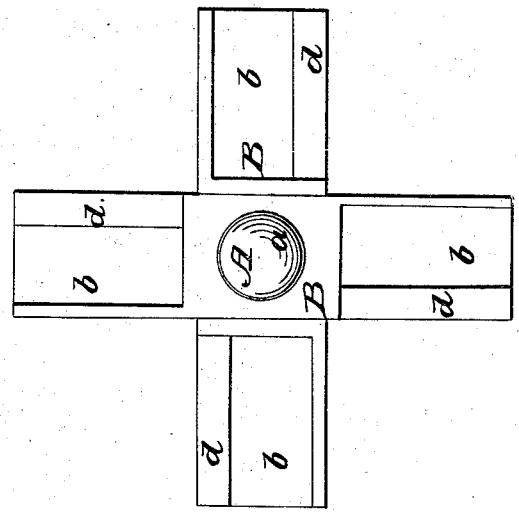
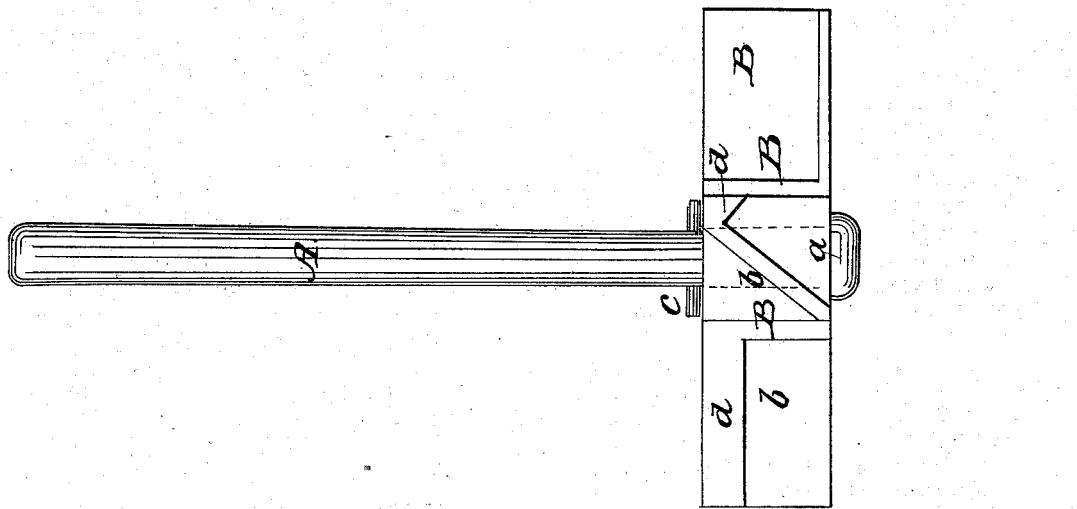
Witnesses
Jr Delavan
T. N. Post
Inventor
E. M. Wright
By his Atty,
J. S. Brown

UNITED STATES PATENT OFFICE.

E. M. WRIGHT, OF WILMINGTON, OHIO.

IMPROVEMENT IN CHURN-DASHERS.

Specification forming part of Letters Patent No. 47,763, dated May 16, 1865.

*To all whom it may concern:*

Be it known that I, E. M. WRIGHT, of Wilmington, in the county of Clinton and State of Ohio, have invented a new and Improved Churn-Dasher; and I do hereby declare that the following is a full and exact description thereof, reference being had to the accompanying drawings, making part of this specification.

Figure 1 is a side elevation of the churn-dasher; Fig. 2, a bottom view thereof.

Like letters designate corresponding parts in both figures.

I make the dasher B in the form of a cross, or its equivalent, and allow it a free revolving motion around its handle or rod A, there being a head or enlargement, $a$, at the lower end of the handle to support the dasher, and a pin, $c$, through the handle above the dasher, so as to prevent the dasher from rising on the handle, and at the same time so as to offer no impediment to the revolving motion of the dasher.

My invention consists in the employment of oblique stops $d\ d$ on the lower side of the oblique wings $b\ b$ of the dasher, the obliquity of the stops being in the opposite direction to that of the wings themselves, all substantially as shown in the drawings.

The upper surface of the dasher-wings are generally plane, though there might be corresponding stops thereon; but I do not contemplate such, since, by omitting them there is very little impediment offered to the raising of the dasher through the cream, the dasher yielding to the cream by turning round on the handle. But when the dasher descends, the stops $d\ d$ have a tendency to hold the dasher from turning round from the action of the oblique wings, and thus to produce strong agitation of the cream, the splashing thereof being turned in opposite directions. Therefore there is comparatively little friction or resistance in raising the dasher, and this is just what is desired, while the utmost resistance and agitation of the cream is produced by the downward motion of the dasher, as required.

What I claim as my invention, and desire to secure by Letters Patent, is—

The stops $d\ d$, arranged upon the lower surfaces of the dasher-wings, substantially as and for the purpose herein specified.

The above specification of my improved churn-dasher signed by me this 1st day of February, 1865.

E. M. WRIGHT.

Witnesses:
W. B. FISHER,
FRANKLIN BAYHAN.